(12) United States Patent
Planche et al.

(10) Patent No.: US 6,218,449 B1
(45) Date of Patent: Apr. 17, 2001

(54) PROCESS FOR THE PREPARATION OF FUNCTIONALIZED ELASTOMER/BITUMEN COMPOSITIONS AND THEIR USE IN COATINGS

(75) Inventors: Jean-Pascal Planche, St. Just Chaleyss; Paul Maldonado, St. Symphorien D'Ozon; Bernard Neff, Francheville; Thierry Senninger, Hayange; Annie Zins, Seyssuel; Stēphane Drouilhet, Tarbes, all of (FR)

(73) Assignee: Elf Antar France, Courbevoie (FR)

( * ) Notice: Subject to any disclaimer, the term of this patent is extended or adjusted under 35 U.S.C. 154(b) by 0 days.

(21) Appl. No.: 09/194,705

(22) PCT Filed: Apr. 17, 1998

(86) PCT No.: PCT/FR98/00789
§ 371 Date: Apr. 12, 1999
§ 102(e) Date: Apr. 12, 1999

(87) PCT Pub. No.: WO98/47967
PCT Pub. Date: Oct. 29, 1998

(30) Foreign Application Priority Data

Apr. 21, 1997 (FR) .................................................. 97 04893

(51) Int. Cl.⁷ ...................................................... C08L 95/00
(52) U.S. Cl. ................................. 524/68; 524/59; 524/70; 524/71; 525/54.5
(58) Field of Search ................................. 524/59, 68, 70, 524/71; 525/54.5

(56) References Cited

U.S. PATENT DOCUMENTS 3,954,723 * 5/1976 Oswald ................................. 528/27

* cited by examiner

Primary Examiner—Peter Szekely
(74) Attorney, Agent, or Firm—Burgess, Ryan & Wayne; Milton J. Wayne; William R. Moran

(57) ABSTRACT

The invention provides a method comprising contacting, between 100° C. and 230° C. and under agitation, an elastomer, a functionalising agent and optionally, a peroxide compound. The functionalising agent is a thiolcarboxylic acid polyester or a reaction product of a thiolcarboxylic acid or ester with ethylene sulphide. The functionalised elastomer can also be pre-formed, then incorporated into the bitumen. The resulting compositions are usable directly or after dilution, for forming bituminous binders to produce surfacing, coating and waterproofing materials.

40 Claims, No Drawings

PROCESS FOR THE PREPARATION OF FUNCTIONALIZED ELASTOMER/BITUMEN COMPOSITIONS AND THEIR USE IN COATINGS

BACKGROUND OF THE INVENTION

1) Field of the Invention

The invention relates to a process for the preparation of functionalized elastomer/bitumen compositions. It further relates to the application of the compositions obtained to the production of coatings and in particular of road surfacings, of bituminous mixes or else of watertight facings and it also relates to a mother solution which can be employed for the preparation of the said compositions.

2) Background Art

A description is given, in the citation U.S. Pat. No. 4,011,184, of a process for the preparation of functionalized elastomer/bitumen compositions, one of the methods of preparation of which consists in bringing a bitumen into contact, the operation being carried out at temperatures of between 100° C. and 200° C. and with stirring, with an elastomer, particularly a block copolymer of styrene and of a conjugated diene, in an amount representing 0.1% to 25% and very especially 1% to 5% by weight of the bitumen, and an ethylenically unsaturated carboxylic acid or an anhydride of such an acid, for example maleic anhydride, in a proportion corresponding to 0.5% to 10% of the weight of bitumen and of elastomer, the said contact being maintained for a time sufficient to produce, within the bitumen, a functionalized elastomer carrying carboxylic acid or carboxylic acid anhydride functional groups capable of creating directly, by formation of hydrogen bonds, or by addition of a salifying agent capable of reacting with the carboxyl groups, temperature-reversible bridgings between the macromolecular chains of the elastomer and/or between the said macromolecular chains and the bitumen.

The functionalized elastomer/bitumen compositions obtained as indicated above are less susceptible to gelling phenomena than elastomer/bitumen compositions produced by crosslinking elastomers, such as, in particular, block copolymers of styrene and of a conjugated diene, such as butadiene or isoprene, with sulphur within a bitumen. It is possible, for this reason, to produce functionalized elastomer/bitumen compositions which have a high elastomer content and which can act as concentrates. These compositions are more economical to prepare, to store, and to transport than the corresponding compositions with a lower elastomer content and they can be easily diluted at the time of use, by addition of bitumen, in order to form the elastomer/bitumen binders with a lower elastomer content which are commonly used for the production of coatings and in particular of road surfacings.

However, the functionalized elastomer/bitumen compositions prepared by using the abovementioned technique described in the citation U.S. Pat. No. 4,011,184 only have to a limited degree carboxyl functional groups attached to the macromolecular chains of the elastomer associated with the bitumen and capable of inducing crosslinkings or bridgings of the said chains with one another and/or with the bitumen, directly or after addition of the salifying agent. For this reason, the physicomechanical characteristics of such compositions, in particular plasticity range (difference between the ring-and-ball softening temperature and the Fraass brittleness point) and mechanical characteristics at low temperatures of use, are not entirely satisfactory.

Provision is made, in the French patent application filed on Oct. 19, 1995 by the Applicant Company under No. 9512276, for a process for the preparation of functionalized elastomer/bitumen compositions exhibiting an expanded plasticity range and improved tensile mechanical characteristics, which process is comparable with the process of the citation U.S. Pat. No. 4,011,184 and is distinguished therefrom by the use of a specific functionalization agent in order to introduce, into the elastomer and optionally into the bitumen, the carboxyl or derived functional groups which induce the cross-linkings. This functionalization agent is composed of at least one compound chosen from $C_3$ and greater thiolcarboxylic acids, esters of $C_2$ and greater thiolcarboxylic acids with monoalcohols and the corresponding disulphides.

SUMMARY OF THE INVENTION

It has now been found that it is possible to prepare polymer/bitumen compositions having physico-mechanical characteristics comparable with those of the polymer/bitumen compositions produced by the process of the abovementioned French patent application by resorting to other functionalization agents composed of polyesters of thiolcarboxylic acids and of polyols or of reaction products of thiolcarboxylic acids or esters with ethylene sulphide.

The subject-matter of the invention is thus a process for the preparation of functionalized elastomer/bitumen compositions with a wide plasticity range, of the type in which a bitumen or mixture of bitumens is brought into contact, the operation being carried out at temperatures of between 100° C. and 230° C. and with stirring for a period of time of at least ten minutes, with, with respect to the weight of the bitumen, between 0.5% and 25%, more particularly between 1% and 15%, of an elastomer and between 0.01% and 6%, more especially between 0.05% and 3%, of a functionalization agent, the said process being characterized in that the functionalization agent is composed of at least one compound chosen from the group composed of:

(i) poly(thiolcarboxylic esters) A corresponding to the formula

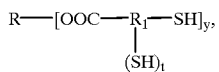

(ii) polythioethers B resulting from the reaction of at least one polythiolester A with ethylene sulphide and containing, on average, 0.1 to 20 and more particularly 0.4 to 12 ($SCH_2CH_2$) units per molecule A and (iii) polythioethers E resulting from the reaction of at least one thiol compound D of formula

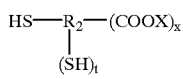

with ethylene sulphide and containing, on average, 0.1 to 20 and more particularly 0.4 to 12 ($SCH_2CH_2$) units per molecule D, with, in these formulae, R denoting a y-valent hydrocarbon radical, which optionally contains oxygen, having a molecular mass at least equal to 28 and which can range up to 20,000 and more particularly up to 12,000, $R_1$ representing a (t+2)-valent $C_1$ to $C_{30}$, more especially $C_1$ to $C_{12}$ and very particularly $C_1$ to $C_8$ hydrocarbon radical, $R_2$ representing an (x+t+1)-valent $C_1$ to $C_{30}$, more especially $C_1$ to $C_{12}$ and very particularly $C_1$ to $C_8$ hydrocarbon radical, X denoting a hydrogen atom or a monovalent $C_1$ to $C_{12}$ and more especially $C_1$ to $C_8$ hydrocarbon radical $R_5$, t representing zero or one, y being an integer ranging from 2 to 10, more especially from 2 to 6 and very particularly from 2 to 4, and x denoting an integer having a value ranging from 1 to 3, preferably equal to 1 or 2, with $x+t \leq 3$.

DESCRIPTION OF THE PREFERRED EMBODIMENTS

The functionalization agent is advantageously chosen from:

(a) poly(thiolcarboxylic esters) $A_1$ corresponding to the formula

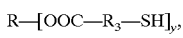
$$R-[OOC-R_3-SH]_y,$$

(b) polythioethers $B_1$ resulting from the reaction of at least one polythiolester $A_1$ with ethylene sulphide and containing, on average, 0.1 to 20 and more particularly 0.4 to 12 ($SCH_2CH_2$) units per molecule $A_1$ and (c) polythioethers $E_1$ resulting from the reaction of at least one thiol compound $D_1$ of formula

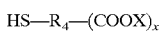
$$HS-R_4-(COOX)_x$$

with ethylene sulphide and containing, on average, 0.1 to 20 and more particularly 0.4 to 12 ($SCH_2CH_2$) units per molecule $D_1$, with, in these formulae, $R_3$ representing a divalent $C_1$ to $C_{12}$ and more especially $C_1$ to $C_8$ hydro—carbon radical, $R_4$ denoting an (x+1)-valent $C_1$ to $C_{12}$ and more particularly $C_1$ to $C_8$ hydrocarbon radical and R, X, y and x having the meanings given above.

The (t+2)-valent, (x+t+1)-valent, divalent, (x+1)-valent and monovalent hydrocarbon radicals $R_1$, $R_2$, $R_3$, $R_4$ and $R_5$ respectively can be saturated, linear or branched, $C_1$ to $C_{12}$, more particularly $C_1$ to $C_8$ and very especially $C_1$ to $C_6$ aliphatic radicals, unsaturated, linear or branched, $C_2$ to $C_{12}$, more particularly $C_2$ to $C_8$ and very especially $C_2$ to $C_6$ aliphatic radicals, $C_4$ to $C_{12}$, more particularly $C_6$ to $C_8$, cycloaliphatic radicals or $C_6$ to $C_{12}$, more particularly $C_6$ to $C_8$, aromatic radicals.

The x-valent radicals R can be macromolecular or non-macromolecular hydrocarbon radicals. It is possible for x-valent, in particular divalent (x=2), trivalent (x=3) or tetravalent (x=4), hydrocarbon radicals R, of the non-macromolecular type, to be composed of saturated or unsaturated, linear or branched, $C_2$ to $C_{30}$, more particularly $C_2$ to $C_{12}$ and in particular $C_2$ to $C_8$ aliphatic radicals, of $C_4$ to $C_{12}$ and preferably $C_6$ to $C_8$ cycloaliphatic radicals or of $C_6$ to $C_{12}$ and preferably $C_6$ to $C_8$ aromatic radicals. It is possible for x-valent hydrocarbon radicals R of the macromolecular type to be composed, in particular, of divalent (x=2) polyolefinic radicals of formula -$[P]_n$-, in which P represents a unit resulting from the polymerization of one or more olefinic $C_2$ to $C_4$ monomers, such as, for example, ethylene, propylene, butene or butadiene, and n denotes the number of repeat units forming the macromolecular chain of the radical, the said number n being such that the radical has a molecular mass of between 160 and 20,000 and more particularly between 160 and 12,000. The x-valent radicals R can also be composed of divalent (x=2) oxyalkylene or polyoxyalkylene radicals of formula —$[C_hH_{2h}O]_m$—$C_hH_{2h}$—, in which h denotes an integer ranging from 2 to 4 and m represents the number of repeat units, which are identical or different, forming the chain of the radical, the said number m being such that the radical has a molecular mass of between 70 and 20,000 and more particularly between 70 and 12,000. Such radicals are in particular (poly)oxyethylene, (poly)oxypropylene or (poly)oxytetramethylene radicals.

Examples of radicals R are in particular the radicals

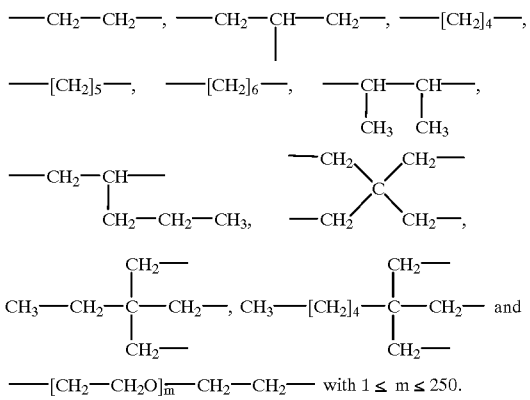

These radicals R derive respectively, by loss of OH groups, from the polyols ethylene glycol, glycerol, 1,4-butanediol, 1,5-pentanediol, 1,6-hexanediol, 2,3-butanediol, 1,2-pentanediol, pentaerythritol, trimethylolpropane, trimethylolhexane or polyethylene glycols with a molecular mass ranging from 106 to 11,062.

Examples of functionalization agent which can be used in the process according to the invention are such as the esters of β-mercaptopropionic acid or of thioglycolic acid with each of the specific polyols mentioned hereinabove and, in particular, trimethylolpropane thioglycolate of formula $CH_3$—$CH_2$—$C[CH_2OOCCH_2SH]_3$, trimethylolpropane β-mercaptopropionate of formula $CH_3$—$CH_2$—$C[CH_2OOCCH_2CH_2SH]_3$, pentaerythrityl β-mercaptopropionate of formula $C[CH_2OOCCH_2CH_2SH]_4$ and pentaerythrityl thioglycolate of formula $C[CH_2OOCCH_2SH]_4$, as well as the thioethers resulting from the reaction of the said esters with ethylene sulphide and containing, on average, 0.1 to 20 and more particularly 0.4 to 12 ($SCH_2CH_2$) units per molecule and, in particular, the thioethers of formulae $H(SCH_2CH_2)_{1.1}SCH_2COOCH_3$, $H(SCH_2CH_2)_{1.1}SCH_2CH_2COOCH_3$, $C[CH_2OOCCH_2CH_2SH]_4/0.5$ ($SCH_2CH_2$), $C[CH_2OOCCH_2CH_2SH]_4/3.5$ ($SCH_2CH_2$), $C[CH_2OOCCH_2CH_2SH]_4/3.7(SCH_2CH_2)$, $C[CH_2OOCCH_2SH]_4/1.4(SCH_2CH_2)$ and $C[CH_2OOCCH_2SH]_4/2.6(SCH_2CH_2)$.

The bitumen or mixture of bitumens which is employed in the preparation of the functionalized elastomer/bitumen compositions is advantageously chosen from the various bitumens which have a kinematic viscosity at 100° C. of between $0.5 \times 10^{-4}$ m²/s and $3 \times 10^{-2}$ m²/s and preferably between $1 \times 10^{-4}$ m²/s and $2 \times 10^{-2}$ m²/s. These bitumens can be direct distillation or vacuum distillation bitumens or else blown or semi-blown bitumens, propane or pentane deasphalting residues, viscosity breaking residues, indeed even some petroleum cuts or mixtures of bitumens and of vacuum distillates or alternatively mixtures of at least two of the products which have just been listed. Besides a kinematic viscosity included within the abovementioned ranges, the bitumen or mixture of bitumens employed in the process according to the invention advantageously has a penetrability at 25° C., defined according to NF Standard T 66004, of between 5 and 900 and preferably between 10 and 400.

The elastomer which is employed in the process according to the invention and which is recovered functionalized by sequences containing carboxylic acid or carboxylic ester functionality in the functionalized elastomer/bitumen compositions resulting from the said process can be composed of one or a number of elastomeric polymers, such as polyisoprene, polynorbornene, polybutadiene, butyl rubber, ethylene/propylene (EP) random copolymers or ethylene/propylene/diene (EPDM) random terpolymers. The said elastomer is advantageously partially, the remaining part being composed of one or more polymers as mentioned above or other polymers, or completely composed of one or more random or block copolymers of styrene and of a conjugated diene, such as butadiene, isoprene, chloroprene, carboxylated butadiene or carboxylated isoprene, and more particularly of one or more copolymers chosen from block copolymers, with or without a random junction, of styrene and of butadiene, of styrene and of isoprene, of styrene and of chloroprene, of styrene and of carboxylated butadiene or of styrene and of carboxylated isoprene. The copolymer of styrene and of conjugated diene, and in particular each of the abovementioned copolymers, advantageously has a styrene content by weight ranging from 5% to 50%. The weight-average molecular mass of the copolymer of styrene and of conjugated diene, and in particular that of the abovementioned copolymers, can be, for example, between 10,000 and 600,000 daltons and preferably lies between 30,000 and 400,000 daltons. The copolymer of styrene and of conjugated diene is preferably chosen from di- or triblock copolymers of styrene and of butadiene, of styrene and of isoprene, of styrene and of carboxylated butadiene or of styrene and of carboxylated isoprene which have styrene contents and weight-average molecular masses lying within the ranges defined above. It is possible in particular to use a random or block copolymer of styrene and of butadiene which has a styrene content and a weight-average molecular mass as mentioned above and which, in addition, exhibits a content by weight of units containing a 1,2 double bond resulting from butadiene of between 12% and 50% and preferably ranging from 20% to 40% by weight of the said copolymer.

If need be, in order to facilitate attachment of the functional sequences, provided by the functionalization agent, to the elastomer and optionally to the bitumen, it is possible to add a peroxide compound, which generates free radicals at temperatures of between 100° C. and 230° C., to the reaction mixture formed from the bitumen or mixture of bitumens, from the elastomer and from the functionalization agent. The said peroxide compound, employed in an amount ranging from 0% up to, for example, 15% by weight of the elastomer, can be, in particular, chosen from dihydrocarbyl peroxides, such as di-tert-butyl peroxide and dicumyl peroxide.

The bitumen or mixture of bitumens is advantageously brought into contact with the elastomer, the functionalization agent and, if it is employed, the peroxide compound, which operation generates a reaction product constituting the functionalized elastomer/bitumen composition, by first of all incorporating the elastomer in the bitumen or mixture of bitumens, use being made of a proportion of elastomer having a value, with respect to the bitumen, chosen as defined above for this proportion, the operation being carried out at temperatures of between 100° C. and 230° C., more particularly between 120° C. and 190° C., and with stirring for a sufficient period of time, generally of the order of a few tens of minutes to a few hours and, for example, of the order of 30 minutes to 8 hours, in order to form a homogeneous mixture of bitumen and of elastomer, by then introducing the functionalization agent into the said mixture, followed, if it is employed, by the peroxide compound, in appropriate amounts chosen within the ranges defined above for the said amounts, and by maintaining the whole mixture with stirring at temperatures of between 100° C. and 230° C., more particularly between 120° C. and 190° C., and identical or not to the temperatures for incorporation of the elastomer in the bitumen or mixture of bitumens, for a period of time of at least 10 minutes and generally ranging from 10 minutes to 5 hours, more particularly from 30 minutes to 180 minutes, in order to form the reaction product constituting the functionalized elastomer/bitumen composition.

In an alternative form of the implementation of the process according to the invention, a functionalized elastomer is formed, in a first stage, by grafting the functionalization agent onto the chosen elastomer and then the functionalized elastomer obtained is incorporated in the bitumen or mixture of bitumens, the said incorporation being carried out immediately after the functionalized elastomer has been obtained or else after a more or less extended storage time of the said functionalized elastomer.

The functionalized elastomer is prepared, advantageously, by bringing the chosen elastomer into contact with the functionalization agent, used in an amount representing 0.2% to 25% and more particularly 0.5% to 15% of the weight of the elastomer, the operation being carried outin-bulk orin a solvent and/or diluent medium and at temperatures of between 40° C. and 250° C.

If need be, in order to facilitate attachment of the sequences to be grafted, generated by the functionalization agent, onto the elastomer, it is possible to add, to the grafting reaction mixture, a radical initiator which generates free radicals at the temperatures, of between 40° C. and 250° C., chosen for the grafting, which radical initiator is in particular a peroxide compound and, for example, a dihydrocarbyl peroxide, such as lauroyl peroxide, benzoyl peroxide, dicumyl peroxide or di-tert-butyl peroxide. The amount of radical initiator can vary fairly widely and can represent up to 15%, more especially 0.01% to 6% and more particularly 0.05% to 3% by weight of the elastomer.

The grafting reaction mixture can advantageously contain, by weight of the elastomer, 0.1% to 3.5% and more especially 0.1% to 2.5% of one or more antioxidizing agents. In particular, the said reaction mixture can contain, by weight of the elastomer, 0.1% to 1.5% and preferably 0.1% to 1% of a hindered phenol and 0% to 2% and preferably 0% to 1.5% of a dialkylphenyl triphosphite.

The presence of the hindered phenol alone or of the hindered phenol/dialkylphenyl triphosphite combination in the grafting reaction mixture prevents the elastomer from crosslinking during the grafting operation. When the grafting reaction mixture contains both a hindered phenol and a dialkylphenyl triphosphite, the amount by weight of triphosphite is preferably at least equal to and more especially greater than that of the hindered phenol.

The hindered phenol is advantageously chosen from the compounds corresponding to the formula

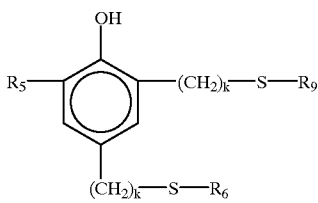

in which the $R_5$, $R_6$ and $R_9$ symbols, which are identical or different, represent monovalent $C_1$ to $C_{18}$ and more particularly $C_1$ to $C_{12}$ aliphatic hydrocarbon radicals, very especially methyl and tert-butyl for $R_5$ and hexyl, heptyl, nonyl and very particularly octyl for $R_6$ and $R_9$, and k is a number from 0 to 5. As regards the dialkylphenyl triphosphite, it is more particularly chosen from the compounds corresponding to the formula

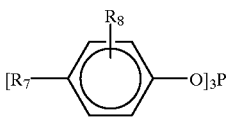

in which the $R_7$ and $R_8$ symbols, which are identical or different, represent H or monovalent $C_1$ to $C_{18}$ and more particularly $C_1$ to $C_{12}$ aliphatic hydrocarbon radicals, very especially H, isopropyl and tert-butyl for $R_7$ and H, tert-butyl, hexyl, heptyl, octyl or nonyl for $R_8$.

As indicated above, the grafting can be carried out in bulk, that is to say in the absence of any solvent or diluent, or, in contrast, in a solvent and/or diluent medium. The elastomer can thus advantageously represent 10% to 100% and preferably 15% to 100% of the overall weight of elastomer and of solvent and/or diluent medium. The said solvent and/or diluent medium, in which the grafting reaction can be carried out, can be composed of any liquid which is without effect on the components participating in the grafting reaction and it can be chosen, for example, from hydrocarbons, in particular aromatic or aliphatic hydrocarbons such as ethylbenzene or hexane or a mixture of ethylbenzene and hexane, which are liquid at the temperatures chosen for the grafting.

The duration of the grafting reaction can vary from a few minutes, for example 5 to 10 minutes, to several hours, for example 4 to 5 hours.

When the grafting reaction is carried out while operating in a solvent and/or diluent medium, the functionalized elastomer resulting from the grafting is separated from the said medium by any technique known for this purpose and, for example, by a technique which includes diluting the reaction mixture resulting from the grafting, followed by precipitating the diluted mixture in a precipitating liquid, such as acetone.

The reaction product, resulting from bringing the bitumen or mixture of bitumens into contact with the elastomer, the functionalization agent and, if it is employed, the peroxide compound, or else the product resulting from the incorporation of the functionalized elastomer in the bitumen or mixture of bitumens can advantageously have added to it, the addition being carried out with stirring at temperatures of between 100° C. and 230° C. and more particularly between 120° C. and 190° C., one or more additives capable of reacting with the carboxyl or carboxylic ester functional groups carried by the elastomer and optionally by the bitumen in order to activate or reinforce the crosslinking between the macromolecular chains of the elastomer and/or between the said macromolecular chains and the bitumen and thus to reinforce the physicomechanical characteristics of the functionalized elastomer/bitumen composition. These reactive additives can be in particular primary or secondary amines, especially polyamines, alcohols, aminoalcohols, epoxides or metal compounds.

Reactive additives of the amine type are, for example, aromatic diamines such as 1,4-diaminobenzene, 2,4-diaminotoluene, diaminonaphthalene, bis(4-aminophenyl) sulphone, bis(4-aminophenyl) ether or bis(4-aminophenyl) methane, aliphatic or cycloaliphatic diamines such as those of formula $H_2N-R_{10}-NH_2$ where $R_{10}$ denotes a $C_2$ to $C_{12}$ alkylene or $C_6$ to $C_{12}$ cycloalkylene radical, for example ethylenediamine, diaminopropane, diaminobutane, diaminohexane, diaminooctane, diaminodecane, diaminododecane, diaminocyclohexane, diaminocyclooctane or diaminocyclododecane, polyethylenepolyamines or polypropylenepolyamines such as diethylenetriamine, triethylenetetramine, tetraethylenepentamine or dipropylenetriamine or else fatty amines or polyamines, that is to say amines or polyamines containing a $C_{12}$ to $C_{18}$ alkyl or alkenyl radical bonded to the nitrogen atom of an amine group.

Reactive additives of the alcohol type are, in particular, polyols such as diols or triols and especially diols of formula $HO-R_{11}-OH$, where $R_{11}$ denotes a hydrocarbon radical, especially a $C_2$ to $C_{18}$ alkylene, $C_6$ to $C_8$ arylene and $C_6$ to $C_8$ cycloalkylene radical, and polyetherdiols of formula $HO\text{-}\!\!\!+\!\!C_qH_{2q}O\text{-}\!\!\!\!+\!\!_r$ where q is a number ranging from 2 to 6 and especially equal to 2 or 3 and r is a number at least equal to 2 and ranging, for example, from 2 to 20. Examples of such polyols are such as ethylene glycol, propylene glycol, butylene glycol, diethylene glycol, triethylene glycol, tetraethylene glycol, hexanediol, octanediol and polyhydroxylated polybutadiene.

Reactive additives of the metal compound type are, in particular, compounds such as hydroxides, oxides, alkoxides such as methoxides, ethoxides, propoxides, butoxides and in particular tert-butoxides, carboxylates such as formates and acetates, nitrites, carbonates and bicarbonates of metals from groups I, II, III or VIII of the Periodic Table of the Elements, especially Na, K, Li, Mg, Ca, Cd, Zn, Ba, Al and Fe.

The amount of the reactive additive or of the reactive additives, which are incorporated in the product constituting the functionalized elastomer/bitumen composition and resulting from bringing the bitumen or mixture of bitumens into contact with the elastomer, the functionalization agent and, if it is employed, the peroxide compound or else from the incorporation of the functionalized elastomer in the bitumen or mixture of bitumens, can range from 0.01% to 10% and more particularly from 0.05% to 5% of the weight of bitumen present in the said reaction product. The said amount is advantageously between one and four times the stoichiometric amount corresponding to complete reaction of the reactive additive or of the reactive additives with the functional groups carried by the functionalized elastomer.

The mixture generating the abovementioned reaction product constituting the functionalized elastomer/bitumen composition or the said reaction product itself or the product resulting from the incorporation of the functionalized elastomer in the bitumen or mixture of bitumens can further have added to it, the addition being carried out with stirring at temperatures of between 100° C. and 230° C. and more particularly between 120° C. and 190° C., 1% to 40% and more particularly 2% to 30%, by weight of the bitumen, of a fluxing agent which may be composed, in particular, of a hydrocarbon oil which has an atmospheric pressure distillation range, determined according to ASTM Standard D 86-67, of between 100° C. and 600° C. and lying more especially between 150° C. and 400° C. This hydrocarbon oil, which can be in particular a petroleum cut of aromatic nature, a petroleum cut of naphtheno-aromatic nature, a petroleum cut of naphtheno-paraff inic nature, a petroleum cut of paraffinic nature, a coal oil or else an oil of plant origin, is sufficiently "heavy" to limit the evaporation at the time of its addition to the bitumen and, at the same time, sufficiently "light" to be removed as much as possible after the functionalized elastomer/bitumen composition containing it has been spread, so as to regain the same mechanical properties which the functionalized elastomer/bitumen composition prepared without employing any fluxing agent would have exhibited after hot spreading. When the fluxing agent is added to the reaction mixture generating the reaction product constituting the functionalized elastomer/bitumen composition, this addition can be carried out at any time in the constitution of the said reaction mixture. If reactive additives are incorporated in the product constituting the functionalized elastomer/bitumen composition, the fluxing agent can be added to the said product before or after addition of the said reactive additives to the latter. The amount of fluxing agent is chosen within the ranges defined above, in order to be compatible with the desired final use on the work site.

Besides the reactive additives and the fluxing agent, it is also possible to incorporate, either in the reaction mixture generating the reaction product constituting the functionalized elastomer/bitumen composition, at any time in the constitution of the said reaction mixture, or in the said reaction product or in the product resulting from the incorporation of the preformed functionalized elastomer in the bitumen or mixture of bitumens, additives which are conventionally employed in compositions based on bitumen and on polymer, such as promoters of adhesion of the functionalized elastomer/bitumen composition to the mineral surfaces or else fillers such as talc, carbon black or worn tyres reduced to fine powder.

In an embodiment of the process according to the invention, employing a hydrocarbon oil as defined above as fluxing agent, the elastomer, the functionalization agent and optionally, if it is employed, the peroxide compound are incorporated in the bitumen or mixture of bitumens in the form of a mother solution of these products in the hydrocarbon oil forming the fluxing agent, in order to constitute the reaction mixture generating the reaction product forming the functionalized elastomer/bitumen composition. Likewise, in the alternative form of the process according to the invention, in which the functionalized elastomer is preformed before it is incorporated in the bitumen or mixture of bitumens, it is possible to carry out the said incorporation by using the functionalized elastomer in the form of a mother solution of this product in the hydrocarbon oil forming the fluxing agent.

The mother solution is prepared by bringing into contact the ingredients of which it is composed, namely either (i) hydrocarbon oil acting as solvent, elastomer, functionalization agent and optionally, if it is employed, peroxide compound or else (ii) hydrocarbon oil acting as solvent and preformed functionalized elastomer, with stirring at temperatures of between 10° C. and 170° C. and more particularly between 40° C. and 120° C. and less than the decomposition temperature of the peroxide compound if the latter is present, for a sufficient period of time, for example from approximately 30 minutes to approximately 90 minutes, to obtain complete dissolution of the elastomer, of the functionalization agent and, if it is present, of the peroxide compound or else of the preformed functionalized elastomer in the hydrocarbon oil.

The respective concentrations (i) of the elastomer, of the functionalization agent and, if it is present, of the peroxide compound or else (ii) of the preformed elastomer in the mother solution can vary quite widely, especially as a function of the nature of the hydrocarbon oil employed for dissolving (i) the elastomer, the functionalization agent and, if it is employed, the peroxide compound or else (ii) the functionalized elastomer. Thus, the mother solution can contain, by weight of the hydrocarbon oil, either (i) between 5% and 40% and more particularly between 10% and 30% of elastomer, between 0.05% and 10% and preferably between 0.1% and 8% of functionalization agent and, by weight of the elastomer, 0% to 15% and preferably 0% to 10% of peroxide compound or else (ii) between 5% and 50% and more particularly between 10% and 38% of functionalized elastomer.

To prepare the functionalized elastomer/bitumen compositions according to the invention by making use of the mother solution technique, the mother solution, containing either (i) the elastomer, the functionalization agent and, if it is employed, the peroxide compound or else (ii) the functionalized elastomer, is mixed with the bitumen or mixture of bitumens, the operation being carried out at temperatures of between 100° C. and 230° C., more particularly between 120° C. and 190° C., and with stirring, this being done, for example, by incorporating the mother solution in the bitumen or mixture of bitumens maintained with stirring at temperatures of between 100° C. and 230° C. and more particularly between 120° C. and 190° C. and then the resulting mixture is maintained with stirring at temperatures of between 100° C. and 230° C., more particularly between 120° C. and 190° C., for example at the temperatures employed for producing the mixture of the mother solution with the bitumen or mixture of bitumens, for a period of time of at least 10 minutes and generally ranging from 10 minutes to 90 minutes, in order to form a product constituting the functionalized elastomer/bitumen composition.

The amount of mother solution incorporated in the bitumen or mixture of bitumens is chosen to yield the desired amounts, with respect to the bitumen, either (i) of elastomer, of functionalization agent and, if it is employed, of peroxide compound or else (ii) of functionalized elastomer, the said amounts being within the ranges defined above.

The functionalized elastomer/bitumen compositions obtained by the process according to the invention can be employed as they are or else diluted with variable proportions of a bitumen or mixture of bitumens or of a composition according to the invention which has different characteristics, in order to form functionalized elastomer/bitumen binders which have chosen contents of functionalized elastomer. These contents can be either equal (undiluted compositions) to the contents of functionalized elastomer in the corresponding initial functionalized elastomer/bitumen compositions or different (diluted compositions) from these latter contents. The dilution of the functionalized elastomer/bitumen compositions according to the invention with a bitumen or mixture of bitumens or with a composition according to the invention of different characteristics can be carried out either directly following the preparation of the said compositions, when a virtually immediate use of the resulting functionalized elastomer/bitumen binders is required, or else alternatively after a more or less extended period of storage of the functionalized elastomer/bitumen compositions, when a delayed use of the resulting functionalized elastomer/bitumen binders is envisaged.

The bitumen or mixture of bitumens employed for the dilution of a functionalized elastomer/bitumen composition according to the invention can be chosen from the bitumens defined above as being suitable for the preparation of the functionalized elastomer/bitumen compositions.

The dilution of a functionalized elastomer/bitumen composition according to the invention with a bitumen or mixture of bitumens or with a second composition according to the invention with a lower content of functionalized elastomer, in order to form a functionalized elastomer/bitumen binder with a chosen content of functionalized elastomer which is lower than that of the functionalized elastomer/bitumen composition to be diluted, is generally carried out by bringing into contact, with stirring and at temperatures of between 100° C. and 230° C. and more particularly between 120° C. and 190° C., suitable proportions of the functionalized elastomer/bitumen composition to be diluted and of bitumen or mixture of bitumens or of second functionalized elastomer/bitumen composition.

The functionalized elastomer/bitumen binders consisting of the functionalized elastomer/bitumen compositions according to the invention or resulting from the dilution of the said compositions with a bitumen or mixture of bitumens or with another functionalized elastomer/bitumen composition according to the invention, as far as the desired content of functionalized elastomer in the said binders, can be applied, directly or after conversion into aqueous emulsion, to the production of road surfacings of the surface coating type, to the production of bituminous mixes which are put in place with heating or cold, or else to the production of watertight facings.

The invention is illustrated by the following examples, given without any limitation being implied.

In these examples, the amounts and percentages are expressed by weight, except when otherwise indicated.

In addition, the Theological and mechanical characteristics of the bitumens or of the functionalized elastomer/bitumen compositions to which reference is made in the said examples are as follows:
- penetrability, expressed in 1/10 of an mm and determined according to NF Standard T 66004,
- ring-and-ball softening temperature, expressed in ° C. and determined by the ring-and-ball test defined by NF Standard T 66008,
- tensile rheological characteristics, determined according to NF Standard T 46002 and comprising the quantities:
  elongation at break εb, in %,
  breaking stress σb, in daN/cm$^2$,
- Pfeiffer's number (abbreviated to PN), calculated from the relationship $$PN = \frac{20 - 500A}{1 + 50A} \text{ with } A = \frac{\log_{10}800 - \log_{10}pen}{RBT - 25},$$

where "pen" and "RBT" respectively denote the penetrability and the ring-and-ball temperature as defined above, this number providing an indication of the temperature susceptibility of the composition.

EXAMPLES 1 to 9

Control elastomer/bitumen compositions (Examples 1 to 3) and functionalized elastomer/bitumen compositions according to the invention (Examples 4 to 9) were prepared in order to evaluate and compare the physico-mechanical characteristics thereof.

The preparations were carried out under the following conditions:

Example 1 (control)

940 parts of a bitumen having a penetrability at 25° C., determined according to the conditions of NF Standard T 66004, of 74 and 60 parts of a block copolymer of styrene and of butadiene as elastomer, the said copolymer having a weight-average molecular mass of 250,000 daltons and containing 25% of styrene, were introduced into a reactor maintained at 180° C. and with stirring. After mixing for 5 hours with stirring at 180° C., a homogeneous mass constituting the elastomer/bitumen composition (control I) was obtained.

Example 2 (control)

940 parts of the bitumen used in Example 1 and 60 parts of the block copolymer of styrene and of butadiene employed in the said Example 1 were introduced into a reactor maintained at 180° C. with stirring. After mixing for 5 hours with stirring at 180° C., a homogeneous mass was obtained.

4 parts of a source of radical sulphur composed of a di-tert-dodecyl polysulphide, sold by Elf Atochem under the name TPS 32, were then incorporated, at 180° C. and with stirring, in the contents of the reactor and the reaction mixture thus formed was subsequently maintained at the said temperature and with stirring for a period of time of four hours, in order to form a sulphur-crosslinked elastomer/bitumen composition (control II).

Example 3 (control)

A sulphur-crosslinked elastomer/bitumen composition (control III) was prepared, the preparation being carried out as described in Example 2, with, however, replacement of the polysulphide by 1.1 parts of sulphur.

Example 4 (according to the invention)

A functionalized elastomer/bitumen composition was prepared, the preparation being carried out as described in Example 2, with, however, replacement of the polysulphide by 3 parts of a functionalization agent according to the invention composed of pentaerythrityl β-mercaptopropionate of formula C[CH$_2$OOCCH$_2$CH$_2$SH]$_4$.

Example 5 (according to the invention)

A functionalized elastomer/bitumen composition was prepared, the preparation being carried out as described in Example 4. 0.5 part of an aqueous sodium hydroxide solution containing 50% by weight of anhydrous sodium hydroxide (NaOH) was then added to this composition, kept stirring at 180° C., and the whole mixture was kept stirring at 180° C. for an hour in order to hydrolyse the ester functional groups.

Example 6 (according to the invention)

A functionalized elastomer/bitumen composition was prepared, the preparation being carried out as described in Example 4, with, however, replacement of the pentaerythrityl β-mercaptoacetate, used as functionalization agent, by the same amount of trimethylolpropane β-mercaptoacetate of formula CH$_3$—CH$_2$—C[CH$_2$OOCCH$_2$CH$_2$SH]$_3$.

Example 7 (according to the invention)

A functionalized elastomer/bitumen composition was prepared, the preparation being carried out as described in Example 6. 0.5 part of an aqueous sodium hydroxide solution containing 50% by weight of anhydrous sodium hydroxide (NaOH) was then added to this composition, kept stirring at 180° C., and the whole mixture was kept stirring at 180° C. for an hour in order to hydrolyse the ester functional groups.

Example 8 (according to the invention)

A functionalized elastomer/bitumen composition was prepared, the preparation being carried out as described in Example 4, with, however, replacement of the pentaerythrityl β-mercaptoacetate, used as functionalization agent, by the same amount of the reaction product of methyl thioglycolate with ethylene sulphide containing, on average, 1.1 ($SCH_2CH_2$) units per molecule of thioglycolate.

Example 9 (according to the invention)

A functionalized elastomer/bitumen composition was prepared, the preparation being carried out as described in Example 8. 0.5 part of an aqueous potassium hydroxide solution containing 50% by weight of anhydrous potassium hydroxide (KOH) was then added to this composition, kept stirring at 180° C., and the whole mixture was kept stirring at 180° C. for an hour in order to hydrolyse the ester functional groups.

The following characteristics were determined for the control elastomer/bitumen compositions of Examples 1 to 3 and for each of the functionalized elastomer/bitumen compositions obtained according to the invention as indicated in Examples 4 to 9:

viscosity at 60° C., penetrability at 25° C., ring-and-ball softening temperature, Pfeiffer's number, tensile rheological characteristics at 5° C., namely:
  breaking stress (σb),
  elongation at break (εb).

The results obtained are collated in the following table.

TABLE

| EXAMPLES | Pure bitumen | 1 | 2 | 3 | 4 |
|---|---|---|---|---|---|
| Penetration at 25° C. (0.1 mm) | 74 | 65 | 62 | 58 | 44 |
| Ring-and-ball temperature (° C.) | 46.7 | 69 | 73 | 75 | 82.2 |
| Pfeiffer's number | −1.1 | 3.4 | 3.9 | 4 | 4.3 |
| Viscosity at 60° C. (Pa.s) | 180 | 3400 | 13,600 | 14,000 | >50,000 |
| Elongation $\epsilon_b$ (%) | 0 | 130 | >700 | >700 | >700 |
| Stress $\sigma_b$ (daB/cm$^2$) | 0 | 40 | 10 | 11 | 16 |

| EXAMPLES | 5 | 6 | 7 | 8 | 9 |
|---|---|---|---|---|---|
| Penetration at 25° C. (0.1 mm) | 37 | 49 | 46 | 48 | 45 |
| Ring-and-ball temperature (° C.) | 83 | 81 | 83 | 81 | 84 |
| Pfeiffer's number | 3.9 | 4.4 | 4.4 | 4.3 | 4.5 |
| Viscosity at 60° C. (Pa.s) | >50,000 | >50,000 | >50,000 | >50,000 | >50,000 |
| Elongation $\epsilon_b$ (%) | >700 | >700 | >700 | >700 | >700 |
| Stress $\sigma_b$ (daN/cm$^2$) | 18 | 15 | 19 | 16 | 19 |

In the light of the results collated in the table, the following comments may be made:

the comparison of the results of Examples 2 and 3 with those of Example 1 reveals that the addition of polysulphide or of sulphur to the mixture of bitumen and of elastomer results, due to crosslinking by a sulphur donor effect, in an improvement in the consistency (increase in the ring-and-ball temperature), as well as in a decrease in the heat susceptibility (increase in the Pfeiffer's number) and in an improvement in the elasticity characteristics (increase in the tensile elongation $\epsilon_b$ and in the stress at maximum elongation $\sigma_b$);

the comparison of the results of Examples 4, 6 and 8 according to the invention with those of the control Examples 2 and 3 shows that the use of the functionalization agent according to the invention as replacement for TPS or for sulphur results, due to crosslinking by the grafted functional sequences resulting from the functionalization agent, in a marked improvement in the consistency (increase in the ring-and-ball temperature), in the viscosity at 60° C. and in the elasticity characteristics (greater stress at maximum elongation $\sigma_b$);

the comparison of the results of Examples 4 and 5, 6 and 7, and 8 and 9 also reveals that the addition of a strong base (NaOH or KOH) to the functionalized elastomer/bitumen compositions obtained according to the invention further reinforces the consistency (increase in the ring-and-ball temperature) and the elasticity characteristics (increase in the stress at maximum elongation $\sigma_b$)

Example 10 (according to the invention)

A functionalized elastomer/bitumen composition was prepared, the preparation being carried out as described in Example 4, with, however, replacement of the elastomer by the same amount of a diblock copolymer of styrene and of butadiene with a random junction having a weight-average molecular mass of 150,000 and containing 25% of styrene, including 17% in the block form, and 75% of butadiene, including 35% in the form of units containing a 1,2 double bond.

The functionalized elastomer/bitumen composition thus obtained was subsequently diluted with the same bitumen as that defined in Example 1 to a final content of 3.5% of functionalized elastomer in the diluted composition. The dilution operation was carried out at 180° C. and with stirring and the diluted composition formed at the end of addition of the bitumen was kept stirring at 180° C. for a further hour in order to complete its homogenization.

The diluted composition obtained exhibited the following characteristics:

| | |
|---|---|
| penetration at 25° C. (1/10 mm) | 55 |
| ring-and-ball temperature (° C.) | 72 |
| Pfeiffer's number | 4.2 |
| stress $\sigma_b$ at 5° C. (daN/cm$^2$) | 16 |
| elongation $\epsilon_b$ at 5° C. (%) | >700 |

Example 11 (according to the invention)

A functionalized elastomer was first of all prepared by grafting, in solution, as indicated hereinbelow, a functionalization agent according to the invention composed of pentaerythrityl β-mercaptoproprionate onto an elastomer composed of a diblock copolymer of styrene and of butadiene containing 25% of styrene and 75% of butadiene and having a weight-average molecular mass of 108,800 daltons and a polydispersity index (ratio of the weight-average molecular mass to the number-average molecular mass) of 1.1.

The preparation was carried out in a 2 litre stainless steel reactor equipped with a ribbon stirrer and provided with temperature control.

432 parts of the copolymer of styrene and of butadiene and then, successively, 1730 parts of ethylbenzene, 2.16 parts of an antioxidizing agent sold by Ciba under the name Irganox 1520 D, a hindered phenol corresponding to the formula

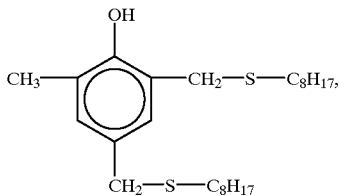

and 48 parts of the functionalization agent were introduced into the reactor maintained under nitrogen.

The mixture was gradually heated to 92° C. with stirring (rotational speed of the stirrer equal to 250 revolutions/minute). After dissolution of the copolymer, a solution comprising 0.67 part of 30% benzoyl peroxide in water and 20 parts of ethylbenzene was added. After 60 minutes, the operation was repeated with a solution comprising 0.33 part of 30% benzoyl peroxide in water and 20 parts of ethylbenzene.

After the second addition of benzoyl peroxide, the contents of the reactor were stirred at 92° C. for 180 minutes with the abovementioned rotational speed of the stirrer.

At the end of this period, a solution comprising 4.32 parts of Irganox 1520 D and 5.18 parts of Irgafos 168, an antioxidizing agent having the formula [t—$C_4H_9$—$C_6H_4$—O]$_3$—P and sold by Ciba, dissolved in 20 parts of ethylbenzene was added to the reaction mixture. The polymer solution resulting from the grafting had 2000 parts of ethylbenzene added to it in order to dilute the polymer and then the diluted solution obtained was introduced into 40,000 parts of acetone in order to precipitate the grafted polymer forming the functionalized elastomer. The latter was then recovered by filtration and the polymer, impregnated with acetone, was left under a stream of air for approximately 30 minutes in order to free it from most of the solvent impregnating it. The said polymer was subsequently redissolved in 1200 parts of a mixture of 20% of ethylbenzene and 80% of hexane containing 14 parts of Irgafos 168 and 12 parts of Irganox 1520 D. The grafted polymer was placed in an oven under vacuum maintained at ambient temperature (approximately 25° C.) in order to remove, under vacuum, the solvent which it still contained and the polymer, substantially devoid of solvent, was dried by being kept in the oven under vacuum at 60° C. for 2 hours.

The content in the grafted elastomer of pentaerythrityl β-mercaptopropionate, determined by infrared spectroscopy, was 1.5% by weight.

As determined from the results of an analysis of the grafted elastomer by steric exclusion chromatography, the said grafted elastomer exhibited a weight-average molecular mass of 357,400 daltons and a polydispersity index of 2.8. The chromatogram was characterized by the presence of two distinct populations giving a bipopulation.

The functionalized elastomer obtained as described above was incorporated in a bitumen similar to that described in Example 1 in order to produce a functionalized elastomer/bitumen composition, the preparation being carried out as follows.

965 parts of bitumen and 35 parts of the functionalized elastomer, in the form of a mother solution in a hydrocarbon oil with an atmospheric pressure distillation range, according to ASTM Standard D 86–87, ranging from 200° C. to 360° C., which mother solution contained, by weight of the hydrocarbon oil, 20% of functionalized elastomer, were introduced into a reactor maintained at 180° C. and with stirring. After mixing for one hour with stirring at 180° C., a homogeneous mass constituting the functionalized elastomer/bitumen composition was obtained. This composition contained 3.6% of functionalized elastomer with respect to the starting bitumen.

The functionalized elastomer/bitumen composition obtained exhibited the following characteristics, determined after stabilization by stoving at 50° C. for 15 days, as a film with a thickness of 1 mm:

| | |
|---|---|
| penetration at 25° C. (1/10 mm) | 90 |
| ring-and-ball temperature (° C.) | 60 |
| Pfeiffer's number | 2.7 |
| stress $\sigma_b$ at −10° C. (MPa) | 0.6 |
| elongation $\epsilon_b$ at −10° C. (%) | >700 |

Example 12 (according to the invention)

A functionalized elastomer was prepared, the preparation being carried out as described in Example 11, with, however, use of 48 parts of ethylene glycol di-β-mercaptoacetate as functionalization agent as replacement for pentaerythrityl β-mercaptopropionate.

The functionalized elastomer contained 1.4% by weight of ethylene glycol dimercaptoacetate and exhibited a weight-average molecular mass of 465,900 and a polydispersity index of 2.7.

From this grafted elastomer, a functionalized elastomer/bitumen composition was prepared containing 3.5% of functionalized elastomer, the preparation being carried out as described in Example 11.

The functionalized elastomer/bitumen composition obtained exhibited the following characteristics, after stabilization as indicated in Example 11:

| | |
|---|---|
| penetration at 25° C. (1/10 mm) | 100 |
| ring-and-ball temperature (° C.) | 57 |
| Pfeiffer's number | 2.4 |
| stress σ_b at −10° C. (MPa) | 0.4 |
| elongation ε_b at −10° C. (%) | >700 |

Example 13 (according to the invention)

A functionalized elastomer was prepared, the preparation being carried out as for Example 11 but using, as functionalization agent, the di-β-mercapto-acetate of a polyethylene glycol having an average molecular mass of 300 g/mol.

216 parts of the copolymer of styrene and of butadiene, 865 parts of ethylbenzene, 1.08 parts of Irganox 1520 D and 24 parts of functionalization agent were used for this example.

The abovementioned mixture was gradually heated to 92° C. with stirring (rotational speed of the stirrer equal to 250 revolutions/minute). After dissolution of the copolymer, a solution comprising 0.34 part of 30% benzoyl peroxide in water and 20 parts of ethylbenzene was added. After 60 minutes, the operation was repeated with a solution comprising 0.17 part of 30% benzoyl peroxide in water and 20 parts of ethylbenzene.

After the second addition of benzoyl peroxide, the contents of the reactor were stirred at 92° C. for 180 minutes with the abovementioned rotational speed of the stirrer.

At the end of this period, a solution comprising 2.16 parts of Irganox 1520 D and 2.59 parts of Irgafos 168, an antioxidizing agent having the formula [t—$C_4H_9$—$C_6H_4$—O—]$_3$—P and sold by Ciba, dissolved in 20 parts of ethylbenzene was added to the reaction mixture. The polymer solution resulting from the grafting had 2000 parts of ethylbenzene added to it in order to dilute the polymer and then the diluted solution obtained was introduced into 40,000 parts of acetone in order to precipitate the grafted polymer forming the functionalized elastomer. The latter was then recovered by filtration and the polymer, impregnated with acetone, was left under a stream of air for approximately 30 minutes in order to free it from most of the solvent impregnating it. The said polymer was subsequently redissolved in 1200 parts of a mixture of 20% of ethylbenzene and 80% of hexane containing 7 parts of Irgafos 168 and 6 parts of Irganox 1520 D. The grafted polymer was placed in an oven under vacuum maintained at ambient temperature (approximately 25° C.) in order to remove, under vacuum, the solvent which it still contained and the polymer, substantially devoid of solvent, was dried by being kept in the oven under vacuum at 60° C. for 2 hours.

The content in the grafted elastomer of polyethylene glycol di-β-mercaptopropionate, determined by infrared spectroscopy, was 0.6% by weight.

As determined from the results of an analysis of the grafted elastomer by steric exclusion chromatography, the said grafted elastomer exhibited a weight-average molecular mass of 154,600 daltons and a polydispersity index of 1.5. The chromatogram was characterized by the presence of two distinct populations giving a bipopulation.

A functionalized elastomer/bitumen composition containing 3.5% of functionalized elastomer was prepared from this grafted elastomer, the preparation being carried out as follows.

965 parts of a bitumen similar to that defined in Example 1 and 35 parts of the functionalized elastomer were introduced into a reactor maintained at 180° C. and with stirring. After mixing for 6 hours with stirring at 180° C., a homogeneous mass constituting the functionalized elastomer/bitumen composition was obtained.

The functionalized elastomer/bitumen composition obtained exhibited the following characteristics:

| | |
|---|---|
| penetration at 25° C. (1/10 mm) | 50 |
| ring-and-ball temperature (° C.) | 78 |
| Pfeiffer's number | 4 |
| stress σ_b at 5° C. (daN/cm$^2$) | 14 |
| elongation ε_b at 5° C. (%) | >700 |

What is claimed is:

1. Process for the preparation of functionalized elastomer/bitumen compositions with a wide plasticity range, in which a bitumen or mixture of bitumens is brought into contact, the operation being carried out at temperatures of between 100° C. and 230° C. and with stirring for a period of time of at least ten minutes, with, with respect to the weight of the bitumen, between 0.5% and 25% of an elastomer and between 0.01% and 6% of a functionalization agent, wherein the functionalization agent is composed of at least one compound selected from the group consisting of:

(i) poly(thiolcarboxylic esters) A corresponding to the formula

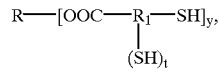

(ii) polythioethers B resulting from the reaction of at least one polythiolester A with ethylene sulphide and containing, on average, 0.1 to 20 ($SCH_2CH_2$) units per molecule A and (iii) polythioethers E resulting from the reaction of at least one thiol compound D of formula

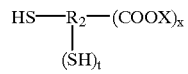

with ethylene sulphide and containing, on average, 0.1 to 20 ($SCH_2CH_2$) units per molecule D, with, in these formulae, R denoting a y-valent hydrocarbon radical, which optionally contains oxygen, having a molecular weight at least equal to 28 and which can range up to 20,000, $R_1$ representing a (t+2)-valent $C_1$ to $C_{30}$ hydrocarbon radical, $R_2$ representing an (x+t+1)-valent $C_1$ to $C_{30}$ hydrocarbon radical, X denoting a hydrogen atom or a monovalent $C_1$ to $C_{12}$ hydrocarbon radical $R_5$, t representing zero or one, y being an integer ranging from 2 to 10 and x denoting an integer having a value ranging from 1 to 3, with x+t≦3.

2. Process according to claim 1, wherein the functionalization agent is composed of at least one compound selected from the group consisting of:

(a) poly(thiolcarboxylic esters) $A_1$ corresponding to the formula

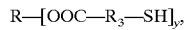

(b) polythioethers $B_1$ resulting from the reaction of at least one polythiolester $A_1$ with ethylene sulphide and containing, on average, 0.1 to 20 (SCH$_2$CH$_2$) units per molecule A$_1$ and (c) polythioethers E$_1$ resulting from the reaction of at least one thiol compound D$_1$ of formula

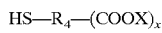

HS—R$_4$—(COOX)$_x$ with ethylene sulphide and containing, on average, 0.1 to 20 and more particularly 0.4 to 12 (SCH$_2$CH$_2$) units per molecule D$_1$, with, in these formulae, R$_3$ representing a divalent C$_1$ to C$_{12}$ hydrocarbon radical, R$_4$ denoting an (x+1)-valent C$_1$ to C$_{12}$ and more hydrocarbon radical and R, X, y and x having the meanings given in claim 1.

3. Process according to claim 1, wherein, in the formula of the poly(thiolcarboxylic esters) A or A$_1$, y is an integer ranging from 2 to 6 and in that, in the formula of the thiol compounds D or D$_1$, x is equal to 1 or 2.

4. Process according to claim 1, wherein the (t+2)-valent, (x+t+1)-valent, divalent, (x+1)-valent and monovalent hydrocarbon radicals R$_1$, R$_2$, R$_3$, R$_4$ and R$_5$ respectively are saturated, linear or branched, C$_1$ to C$_{12}$, aliphatic radicals, unsaturated, linear or branched, C$_2$ to C$_{12}$, aliphatic radicals, C$_4$ to C$_{12}$, cycloaliphatic radicals or C$_6$ to C$_{12}$, aromatic radicals.

5. Process according to claim 1, wherein, in the formula of the functionalization agent, the x-valent radicals R are composed of saturated or unsaturated, linear or branched, C$_2$ to C$_{30}$, aliphatic radicals, of C$_4$ to C$_{12}$ cycloaliphatic radicals or of C$_6$ to C$_{12}$ and aromatic radicals.

6. Process according to claim 1, wherein, in the formula of the functionalization agent, the x-valent radicals R are divalent polyolefinic hydrocarbon radicals of formula —[P]$_n$—, in which P represents a unit resulting from the polymerization of one or more olefinic C$_2$ to C$_4$ monomers, and n denotes the number of repeat units forming the chain of the radical, the said number n being such that the radical has a molecular weight of between 160 and 20,000.

7. Process according to claim 1, wherein, in the formula of the functionalization agent, the x-valent radicals R are composed of divalent oxyalkylene or polyoxyalkylene radicals of formula —[C$_h$H$_{2h}$O]$_m$—C$_h$H$_{2h}$—, in which h denotes an integer ranging from 2 to 4 and m represents the number of repeat units, which are identical or different, forming the chain of the radical, the said number m being such that the radical has a molecular weight of between 70 and 20,000 radicals being radicals selected from the group consisting of oxyethylene, polyoxyethylene, oxypropylene, polyoxypropylene, oxytetramethylene and polyoxytetramethylene radicals.

8. Process according to claim 1, wherein the functionalization agent is employed in an amount of between 0.05% and 3% by weight of the bitumen.

9. Process according to claim 1, wherein the amount of elastomer is between 1% and 15% by weight of the bitumen.

10. Process according to claim 1, wherein the bitumen or mixture of bitumens is chosen from bitumens having a kinematic viscosity at 100° C. of between 0.5×10$^{-4}$m$^2$/s and 3×10$^{-2}$m$^2$/s.

11. Process according to claim 10, wherein the bitumen or mixture of bitumens has a penetrability at 25° C., defined according to NF Standard T 66004, of between 5 and 900.

12. Process according to claim 1, wherein the elastomer is chosen from random or block copolymers of styrene and of a conjugated diene, the said diene is selected from the group consisting of butadiene, isoprene, chloroprene, carboxylated butadiene and carboxylated isoprene.

13. Process according to claim 12, wherein the copolymer of styrene and of conjugated diene contains, by weight, 5% to 50% of styrene.

14. Process according to claim 12 or 13, wherein the weight-average molecular weight of the copolymer of styrene and of conjugated diene is between 10,000 and 600,000 daltons.

15. Process according to claim 1, wherein a peroxide compound, which generates free radicals at temperatures of between 100° C. and 230° C., is added to the reaction mixture formed from the bitumen or mixture of bitumens, from the elastomer and from the functionalization agent, the said peroxide compound being employed in an amount ranging, up to 15% by weight of the elastomer.

16. Process according to claim 1, wherein the bitumen or mixture of bitumens is brought into contact with the elastomer, the functionalization agent and, optionally, the peroxide compound by first of all incorporating the elastomer in the bitumen or mixture of bitumens, the operation being carried out at temperatures of between 100° C. and 230° C., and with stirring, for a period of time of a few tens of minutes to a few hours, in order to form a homogeneous mixture of bitumen and of elastomer, by then introducing the functionalization agent into the said mixture, followed, optionally, by the peroxide compound, in appropriate amounts, and by maintaining the whole mixture with stirring at temperatures of between 100° C. and 230° C., and identical or not to the temperatures for incorporation of the elastomer in the bitumen or mixture of bitumens, for a period of time ranging from 10 minutes to 5 hours, in order to form a reaction product constituting the functionalized elastomer/bitumen composition.

17. Process according to claim 1, wherein, in a first stage, a functionalized elastomer is formed by grafting the functionalization agent onto the chosen elastomer and then the functionalized elastomer obtained is incorporated in the bitumen or mixture of bitumens, the said incorporation being carried out immediately after the functionalized elastomer has been obtained or else after an extended storage time of the said functionalized elastomer.

18. Process according to claim 17, wherein the preparation of the functionalized elastomer by grafting is carried out by bringing the chosen elastomer into contact with the functionalization agent, used in an amount representing 0.2% to 25% of the weight of the elastomer, the operation being carried out in bulk or in a solvent and/or diluent medium and at temperatures of between 40° C. and 250° C.

19. Process according to claim 18, wherein a radical initiator which generates free radicals at the temperatures, of between 40° C. and 250° C., chosen for the grafting is added to the grafting reaction mixture, which radical initiator is a peroxide compound, selected from the group consisting of lauroyl peroxide, benzoyl peroxide, dicumyl peroxide and di-tert-butyl peroxide.

20. Process according to claim 19, wherein the amount of radical initiator represents up to 15% by weight of the elastomer.

21. Process according to claim 18, wherein the grafting reaction mixture additionally contains, by weight of the elastomer, 0.1% to 3.5% of one or more antioxidizing agents.

22. Process according to claim 21, wherein, as antioxidizing agent, the said reaction mixture contains, by weight of the elastomer, 0.1% to 1.5% of a hindered phenol and 0% to 2% and of a dialkylphenyl triphosphite.

23. Process according to claim 22, wherein the grafting reaction mixture contains both a hindered phenol and a dialkylphenyl triphosphite, the amount by weight of triphosphite being at least equal to or greater than that of the hindered phenol.

24. Process according to claim 16, wherein the reaction product constituting the functionalized elastomer/bitumen composition or the product resulting from the incorporation of the functionalized elastomer in the bitumen or mixture of bitumens has added to it, the addition being carried out with stirring at temperatures of between 100° C. and 230° C., one or a number of additives capable of reacting with the carboxyl or carboxylic ester functional groups carried by the elastomer and optionally by the bitumen, the said reactive additives being primary or secondary amines, selected the group consisting of polyamines, alcohols, polyols, aminoalcohols, epoxides and metal compounds, of metals from groups I, II, III or VIII of the Periodic Table of the Elements.

25. Process according to claim 24, wherein the amount of reactive additive or of reactive additives incorporated in the said product represents 0.01% to 10% of the weight of bitumen contained in this product.

26. Process according to claim 1, wherein the reaction mixture formed by bringing the bitumen or mixture of bitumens, the elastomer, the functionalization agent and, optionally, the peroxide compound into contact or the reaction product resulting from the said operation of bringing these ingredients into contact or the product resulting from the incorporation of the functionalized elastomer in the bitumen or mixture of bitumens has added to it, the addition being carried out with stirring at temperatures of between 100° C. and 230° C., by weight of the bitumen, of a fluxing agent, the said fluxing agent being a hydrocarbon oil which has an atmospheric pressure distillation range, determined according to ASTM Standard D 86-67, of between 100° C. and 600° C.

27. Process according to claim 26, wherein the elastomer, the functionalization agent and optionally, the peroxide compound or else the functionalized elastomer are incorporated in the bitumen or mixture of bitumens in the form of a mother solution of these products in the hydrocarbon oil chosen to constitute the fluxing agent.

28. Process according to claim 27, wherein the mother solution, containing either (i) the elastomer, the functionalization agent and, optionally, the peroxide compound or else (ii) the functionalized elastomer, is mixed with the bitumen or mixture of bitumens, the operation being carried out at temperatures of between 100° C. and 230° C., and with stirring, and then the resulting mixture is maintained with stirring at temperatures of between 100° C. and 230° C., for a period of time of at least 10 minutes in order to form a product constituting the functionalized elastomer/bitumen composition.

29. Mother solution, which can be employed for the preparation of functionalized elastomer/bitumen compositions, comprising a hydrocarbon oil which has an atmospheric pressure distillation range, determined according to ASTM Standard D 86-67, of between 100° C. and 600° C. and, in solution in the hydrocarbon oil, either (i) an elastomer, a functionalization agent and optionally a peroxide compound or else (ii) a functionalized elastomer resulting from the grafting of the functionalization agent onto the elastomer, wherein the functionalization agent is composed of at least one compound selected from the group consisting of:

(i) poly(thiolcarboxylic esters) A corresponding to the formula

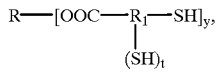

(ii) polythioethers B resulting from the reaction of at least one polythiolester A with ethylene sulphide and containing, on average, 0.1 to 20 ($SCH_2CH_2$) units per molecule A and (iii) polythioethers E resulting from the reaction of at least one thiol compound D of formula

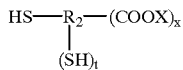

with ethylene sulphide and containing, on average, 0.1 to 20 ($SCH_2CH_2$) units per molecule D, with, in these formulae, R denoting a y-valent hydrocarbon radical, which optionally contains oxygen, having a molecular weight at least equal to 28 and which can range up to 20,000, $R_1$ representing a (t+2)-valent $C_1$ to $C_{30}$ hydrocarbon radical, $R_2$ representing an (x+t+1)-valent $C_1$, to $C_{30}$ hydrocarbon radical, X denoting a hydrogen atom or a monovalent $C_1$ to $C_{12}$ hydrocarbon radical $R_5$, t representing zero or one, y being an integer ranging from 2 to 10 and x denoting an integer having a value ranging from 1 to 3, with x+t≦3.

30. Mother solution according to claim 29, wherein the functionalization agent is composed of at least one compound selected from the group consisting of:

(a) poly(thiolcarboxylic esters) $A_1$ corresponding to the formula

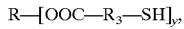

(b) polythioethers $B_1$ resulting from the reaction of at least one polythiolester $A_1$ with ethylene sulphide and containing, on average, 0.1 to 20 ($SCH_2CH_2$) units per molecule $A_1$ and (c) polythioethers $E_1$ resulting from the reaction of at least one thiol compound $D_1$ of formula

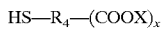

with ethylene sulphide and containing, on average, 0.1 to 20 ($SCH_2CH_2$) units per molecule $D_1$, with, in these formulae, $R_3$ representing a divalent $C_1$ to $C_{12}$ hydrocarbon radical, $R_4$ denoting an (x+1)-valent $C_1$ to $C_{12}$ and hydrocarbon radical and R, X, y and x having the meanings given in claim 1.

31. Mother solution according to claim 29, wherein, in the formula of the poly(thiolcarboxylic esters) A or $A_1$, y is an integer ranging from 2 to 6 and in that, in the formula of the thiol compounds D or $D_1$, x is equal to 1 or 2.

32. Mother solution according to claim 29, wherein the (t+2)-valent, (x+t+1)-valent, divalent, (x+1)-valent and monovalent hydrocarbon radicals $R_1$, $R_2$, $R_3$, $R_4$ and $R_5$ respectively are saturated, linear or branched, $C_1$ to $C_{12}$, aliphatic radicals, unsaturated, linear or branched, $C_2$ to $C_{12}$, aliphatic radicals, $C_4$ to $C_{12}$, cycloaliphatic radicals or $C_6$ to $C_{12}$, aromatic radicals.

33. Mother solution according to claim 29, wherein, in the formula of the functionalization agent, the x-valent radicals R are composed of saturated or unsaturated, linear or branched, $C_2$ to $C_{30}$, aliphatic radicals, of $C_4$ to $C_{12}$ cycloaliphatic radicals or of $C_6$ to $C_{12}$ and aromatic radicals.

34. Mother solution according to claim 29, wherein, in the formula of the functionalization agent, the x-valent radicals R are divalent polyolefinic hydrocarbon radicals of formula —[P]$_n$—, in which P represents a unit resulting from the polymerization of one or more olefinic $C_2$ to $C_4$ monomers, selected from the group consisting of ethylene, propylene, butene and butadiene, and n denotes the number of repeat units forming the chain of the radical, the said number n being such that the radical has a molecular mass of between 160 and 20,000 and more particularly between 160 and 12,000.

35. Mother solution according to claim 29, wherein, in the formula of the functionalization agent, the x-valent radicals R are composed of divalent oxyalkylene or polyoxyalkylene radicals of formula —[$C_hH_{2h}O$]$_m$—$C_hH_{2h}$—, in which h denotes an integer ranging from 2 to 4 and m represents the number of repeat units, which are identical or different, forming the chain of the radical, the said number m being such that the radical has a molecular weight of between 70 and 20,000, the said radicals being radicals selected from the group consisting of oxyethylene, polyoxyethylene, oxypropylene, polyoxypropylene, oxytetramethylene and polyoxytetramethylene radicals.

36. Mother solution according to claim 29, wherein the elastomer is chosen from random or block copolymers of styrene and of a conjugated diene, from the group consisting of isoprene, chloroprene, butadiene, carboxylated butadiene and carboxylated isoprene, the said copolymers having a styrene content ranging from 5% to 50% by weight.

37. Mother solution according to claim 36, wherein the weight-average molecular weight of the copolymers of styrene and of conjugated diene is between 10,000 and 600,000 daltons.

38. Mother solution according to claim 29, wherein the hydrocarbon oil is selected from the group consisting of petroleum cuts of aromatic nature, petroleum cuts of naphtheno-aromatic nature, petroleum cuts of naphtheno-paraffinic nature, petroleum cuts of paraffinic nature, coal oils and oils of plant origin.

39. Mother solution according to claim 29, which contains, by weight of the hydrocarbon oil, between 5% and 40% of elastomer, between 0.05% and 10% of functionalization agent and, by weight of the elastomer, 0% to 15% of the peroxide compound.

40. Mother solution according to claim 29, which contains, by weight of the hydrocarbon oil, between 5% and 50% of functionalized elastomer.

* * * * *